United States Patent [19]

Cline

[11] Patent Number: 4,748,067
[45] Date of Patent: May 31, 1988

[54] PADDED BOOK PANEL CONSTRUCTION

[75] Inventor: Thomas L. Cline, Hanover, Pa.

[73] Assignee: Corra-Board Products Co., Inc., Hanover, Pa.

[21] Appl. No.: 110,355

[22] Filed: Oct. 19, 1987

[51] Int. Cl.$^4$ ............................................... B32B 3/12
[52] U.S. Cl. ................................. 428/186; 428/184; 428/212; 281/15 R
[58] Field of Search ............... 428/182, 184, 185, 186, 428/212; 281/15 R; 150/52 R

[56] References Cited

U.S. PATENT DOCUMENTS

| | | | |
|---|---|---|---|
| 3,935,360 | 1/1976 | Brown | 428/186 |
| 4,673,608 | 6/1987 | Cline | 428/182 |
| 4,710,417 | 12/1987 | Cline | 428/182 |

Primary Examiner—Alexander S. Thomas
Attorney, Agent, or Firm—Daniel J. O'Connor

[57] ABSTRACT

A padded book panel which utilizes three flat chipboard layers between which are positioned an upper undulating layer and a lower undulating layer.

The undulating layers are of generally longer fiber length than the flat chipboard layers.

In a preferred embodiment, the upper undulating layer has longer arms or flutes thereon so that, when passed through a treating pressure roller, the arms of the upper undulating layer are permanently bent or creased. The arms of the lower undulating layer, being of shorter height, are not bent during the roller treating softening process.

The resulting structure is then utilized as an economically manufactured and high-quality padded book panel.

10 Claims, 4 Drawing Sheets

FIG. 2. - PRIOR ART

PADDED BOOK PANEL CONSTRUCTION

BACKGROUND AND OBJECTS OF THE INVENTION

This application is generally related to applicant's U.S. Pat. No. 4,673,608 entitled Book Panel Construction.

As is known in the book panel and bookbinding industry, hardcover books 10 generally have a solid front panel 20 and a solid rear panel 21 with a flexible middle binding section 25 as shown in FIG. 1.

The FIG. 2 prior art drawing illustrates the current construction of padded book panels.

Typically, as shown in FIG. 2, the prior art padded book panels consist of a lower paperboard layer 31 to which is adhesively secured at 35 a foamed plastic compound 38. A vinyl covering layer 39 is also normally added.

By reason of the soft foamed plastic layer 38, when a pressure force P is applied to the panel, i.e. by manually touching it, the panel yields and has a padded high quality feel to the touch.

While such prior art structures have been widely used in the book panel industry, it has been realized by the present inventor that a more economically advantageous structure may be manufactured which produces the same padded effect of prior art systems.

The prior art padded panels of FIG. 2 are typically quite costly to manufacture.

The adhesive joint 35 between the paperboard layer 31 and the foamed soft plastic layer 35 is typically difficult to achieve.

Further, the use of soft foamed plastics compounds produces an industrial hazard resulting from the multiple chemicals and binders required in the production thereof.

Accordingly, it is an object of the present invention to produce a padded book panel structure which is fabricated entirely of paperboard materials.

It is a further object of the invention to utilize economical chipboard materials where possible in the structure.

It is also an object of the present invention to combine flat chipboard layers with undulating layers of longer fiber length paperboard positioned therebetween.

It is also an object to provide that the book panel be subjected to roller pressure treating such that an upper undulating layer is crushed to provide a plush or padded feel to the panel.

It is a further object to provide that a lower undulating layer remain in its substantially uncrushed position to add rigidity to the structure.

Further objects and advantages of the present invention will become apparent as the following description proceeds, and the features of novelty characterizing the invention will be pointed out with particularity in the claims annexed to and forming a part of this specification.

PRIOR ART PATENTS

The most relevant prior art patents presently known to the inventor herein are listed as follows: U.S. Pat. No. 1,868,029 issued to Steinthal; U.S. Pat. No. 1,878,813 issued to Block: U.S. Pat. No. 2,120,818 issued to Steinthal; U.S. Pat. No. 2,239,145 issued to Doner; and U.S. Pat. No. 4,129,212 issued to Hopkins.

The above patents illustrate various built-up hardcover book structures. They do not, however, teach applicant's chipboard and crushed undulation design for padding.

The inventors own related U.S. Pat. No. 4,673,608, describing a chipboard book panel construction, was issued less than one year prior to the present application.

BRIEF DESCRIPTION OF THE DRAWING FIGURES

DESCRIPTION OF THE PREFERRED EMBODIMENT

Figure 1:
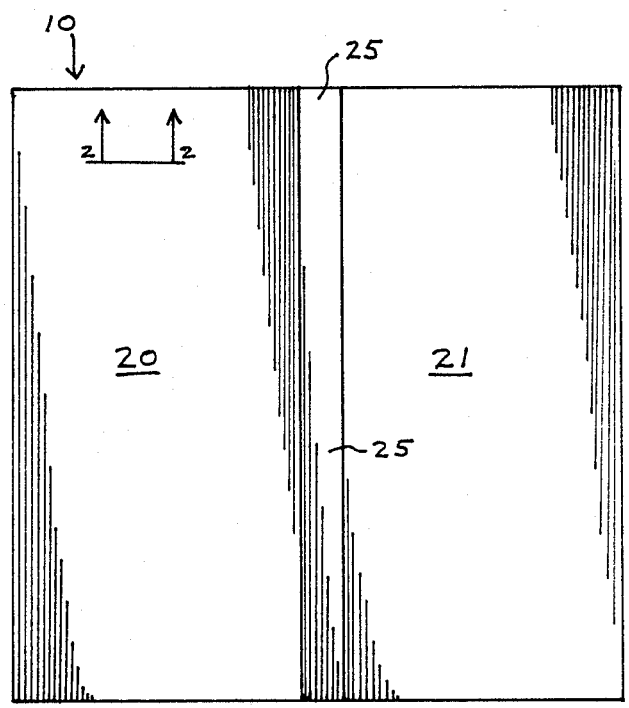
FIG. 1 is a plan view of the book panel structure generally used in the bookbinding industry, showing the outer surfaces of a hardcover book.
Figure 2:
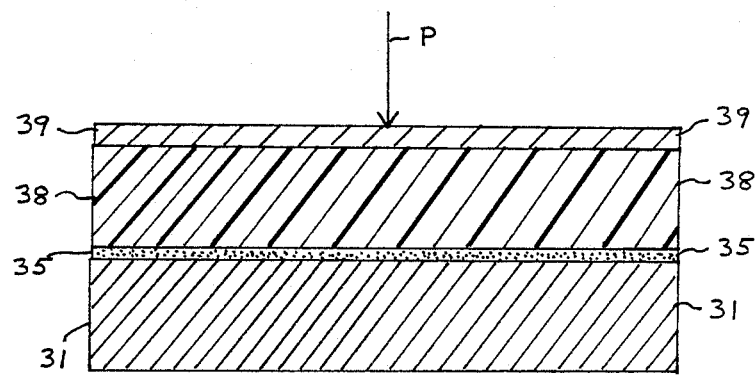
FIG. 2 is a view along lines 2—2 of FIG. 1 which shows the prior art construction of padded book paneling.
Figure 3:
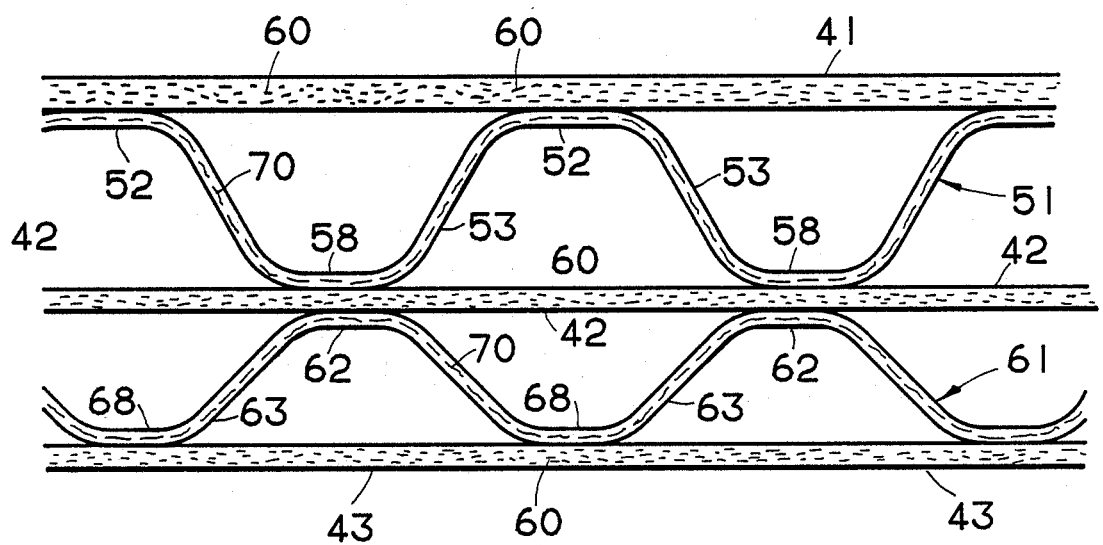
FIG. 3 is also a view along lines 2—2 of FIG. 1 and shows the general structure of the present invention prior to the roller treatment of the panel.

As shown in the pre-roller treatment view of FIG. 3, the book panel of the present invention includes multiple flat chipboard layers 41, 42 and 43.

Chipboard is a term known to those of skill in the art to signify paper products processed from, for example, waste paper materials and thus having relatively short fiber lengths contained therein as shown at 60 in FIG. 3.

The shorter fiber lengths, i.e. 2 mm or less, of the chipboard layers 41, 42 and 43 are in contrast to the longer fiber lengths 70 in the undulating layers 51 and 61. Layers 51 and 61 are typically composed of higher quality kraft paper and have average fiber lengths 70 of 5 mm or more.

The combination of the short fiber length chipboard layers 41, 42 and 43 with the longer fiber length undulating layers 51 and 61 results in a highly durable panel which may be very economically manufactured. When pressure is applied to the outer chipboard layers 41 and 43, the undulating layers 51 and 61 tend to spring them back to their original position.

The various layers shown in FIG. 3 are adhesively secured together as is known generally in the paperboard arts. It is noted, however, that the direct bonding of chipboard to longer fiber length layers has not been heretofore known in the prior art other than in the inventor's own U.S. Pat. No. 4,673,608.

As further shown in FIG. 3, the upper undulating layer 51 is a continuous sheet which has various sections or zones formed thereon.

Lower zones 58 are essentially flat for adhesive contact with the middle chipboard layer 42. Upper zones 52 are also essentially flat and are adhesively sedured to the upper chipboard layer 41. Arms 53 extend between the upper and lower flat zones 52 and 58.

In similar fashion, the lower undulating layer 61 has flat upper zones 62 and flat lower zones 68 formed therein with essentially straight arms 63 formed between the upper and lower flat zones 62 and 68.

As further shown in the pre-roller treatment view of FIG. 3, the undulations in layer 51 are higher than those in lower layer 61. Thus, the spacing between chipboard layers 41 and 42 is greater than the spacing between chipboard layers 42 and 43.

The significance of the above configuration is as follows: When the panel of FIG. 3 is passed through rollers exerting a given pressure thereon, the higher and thus weaker undulations of layer 51 are crushed while the shorter undulations of layer 61, being slightly stronger, remain in their essentially uncrushed position of FIG. 3.

Figure 4:
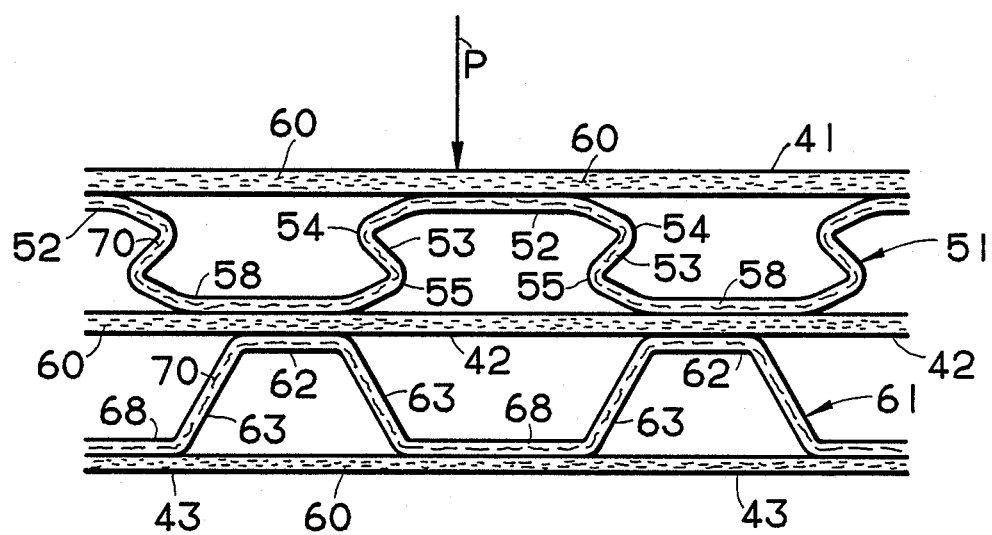
FIG. 4 is a view similar to FIG. 3 which shows the padded panel of the present invention after crushing and ready for its intended book panel usage.

FIG. 4 shows the result of such pressure roller treatment. As shown, the higher undulations of layer 51 are crushed in such manner that each of the arms 53 has an upper bend 54 and a lower bend 55 formed therein. Bend 54 extends outwardly from the undulation while lower bend 55 extends inwardly toward the undulation.

FIG. 4 also illustrates that the lower undulating layer 61 remains, after the pressure roller treatment, in its same uncrushed position as that of FIG. 3.

The significance of the FIG. 4 configuration will thus be appreciated by those of skill in the art. When a pressure force P is applied to the upper chipboard layer 41 (e.g. as when the panel is manually grasped), it moves downward and forces the undulating layer 51 to compress. When the pressure force P is released, the crushed undulating layer 51 tends to force the chipboard layer 41 back to its original position.

Importantly however, because of the stress bends 54 and 55 formed in arms 53, the return force is somewhat slower and more dissipated than the rigid return force of the FIG. 3 configuration wherein arms 53 are straight.

The result is that the configuration of FIG. 4 has a padded feeling when manually grasped or touched at layer 41.

While the upper undulating layer 51 creates the padded effect, the lower undulating layer 61, remaining in its uncrushed position, creates a stiff and rigid effect for durability of the overall panel.

It is to be understood that the upper undulating layer 51 would face toward the outer surface of a book panel to create the plush or padded effect when the book is touched or manually grasped. The lower undulating layer 61 would face toward the inner surface of the book where strength but not the padding effect is required.

The panel of FIG. 4 would of course be covered with vinyl or other suitable material to create a pleasing appearance for the outer surface of a hard cover book.

It is again emphasized that the use of shorter fiber length chipboard layers 41, 42 and 43 in conjunction with the longer fiber length undulating layers is an important economic aspect of the invention. That is, the structure disclosed herein allows the relatively low-cost chipboard material to be utilized as part of a high-quality plush or padded panel which has superior durability by reason of the uncrushed lower undulating layer 61.

As will be appreciated by those of skill in the art, the present invention eliminates the need for costly and hazardous foamed plastic or polymer compounds currently used in the hardcover book arts.

The present invention also uses paper-to-paper bonding in place of the difficult paper-to-plastic bonding of prior art systems.

The invention also yields a plush or padded effect utilizing very cost-efficient materials.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In combination with a hardcover book structure (10) having a solid front panel (20), a solid rear panel (21) and a flexible middle binding section (25),
   a book panel structure having a first upper flat chipboard layer (41),
   said book panel structure having a second middle flat chipboard layer (42),
   said book panel structure having a third lower flat chipboard layer (43),
   a first undulating layer (51) positioned between said first chipboard layer (41) and said second chipboard layer (42),
   said first undulating layer (51) having a plurality of upper flat zone means (52) for adhesive securing to said first chipboard layer (41),
   said first undulating layer (51) having a plurality of lower flat zone means (58) for adhesive securing to said second chipboard layer (42),
   said first undulating layer (51) having a plurality of arm means (53) extending between said upper flat zone means (52) and said lower flat zone means (58),
   and wherein each of said arm means (53) has a first upper bend (54) formed therein and a second lower bend (55) formed therein to provide means whereby a padded effect is created upon depression of the first upper chipboard layer (41),
   a second undulating layer (61) positioned between said second chipobard layer (42) and said third chipboard layer (43),
   said second undulating layer (61) having a plurality of upper flat zone means (62) for adhesive securing to said second chipboard layer (42),
   said second undulating layer (61) having a plurality of lower flat zone means (68) for adhesive securing to said third chipboard layer (43),
   said second undulating layer (61) having a plurality of unbent arm means (63) extending between said upper flat zone means (62) and said lower flat zone means (68).

2. The apparatus of claim 1 wherein each of said flat chipboard layers (41, 42, 43) have relatively shorter fiber lengths contained therein.

3. The apparatus of claim 2 wherein each of said undulating layers (51, 61) have relatively longer fiber lengths contained therein.

4. The apparatus of claim 3 wherein the average fiber length (60) in each of said flat chipboard layers (41, 42, 43) is 2 mm or less.

5. The apparatus of claim 4 wherein the average fiber length (70) in each of said undulating layers (51, 61) is 5 mm or more.

6. The apparatus of claim 5 wherein said first flat chipboard layer (41) is positioned adjacent the outer cover (20, 21) of a hardcover book structure (10) so that a padded effect is produced when the outer cover is depressed.

7. The apparatus of claim 6 wherein each of said first upper bends (54) in said arms (53) extends outwardly away from its respective undulation.

8. The apparatus of claim 7 wherein each of said second lower bends (55) in said arms (53) extends inwardly toward its respective undulation.

9. The apparatus of claim 1 wherein each of said arm means (63) on said second undulating layer (61) are substantially straight in their extension between said upper and lower flat zone means (62, 68) to provide means whereby a rigid and strengthening is produced in the lower region of said book panel.

10. The apparatus of claim 1 wherein, in the uncrushed configuration (FIG. 3), the undulations of said first undulating layer (51) are higher and hence weaker than the undulations of said second undulating layer (61).

* * * * *